C. E. SHAFER.
COMBINED HOE AND POTATO DIGGER.
APPLICATION FILED MAY 31, 1911.
1,026,470.
Patented May 14, 1912.
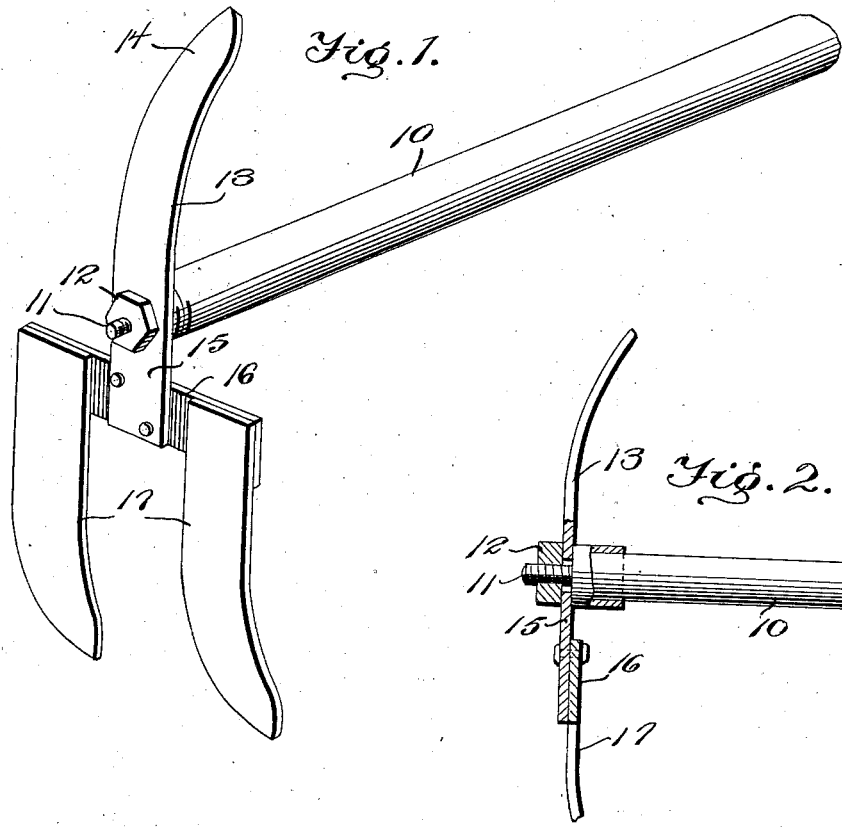
Witnesses
Inventor
C. E. Shafer.
By ..., Attorneys.

UNITED STATES PATENT OFFICE.

CHARLES E. SHAFER, OF LEWISTOWN, MARYLAND.

COMBINED HOE AND POTATO-DIGGER.

1,026,470. Specification of Letters Patent. Patented May 14, 1912.

Application filed May 31, 1911. Serial No. 630,527.

*To all whom it may concern:*

Be it known that I, CHARLES E. SHAFER, citizen of the United States, residing at Lewistown, in the county of Frederick and State of Maryland, have invented certain new and useful Improvements in Combined Hoes and Potato-Diggers, of which the following is a specification.

This invention relates to an improved potato digger, and refers particularly to a combined hoe and digger adapted to perform the various operations required in digging potatoes, and the like.

An object of this invention is to provide a relatively simple hand implement having a pick point which is relatively long and thin for operation around the roots of vines, and a lifting portion for engagement with the roots of the vines to raise the potatoes and deposit the earth after separation therefrom.

The invention further aims at an improved fastening means for the handle of the implement whereby the same can be readily detached from the handle for the purpose of renewing the blades or for shipment.

For a full understanding of the invention, reference is to be had to the following description and accompanying drawings, in which:

Figure 1 is a perspective view of the improved implement; Fig. 2 is a detail sectional view of the connection between the handle and the implement.

Corresponding and like parts are referred to in the following description and indicated in all the views of the drawing by the same reference characters.

Referring to the drawing, 10 designates a handle of any adaptable form and length having a reduced shank 11 upon its lower extremity which is threaded for the reception of a binding nut 12 adapted to clamp the implement between the handle and the same.

The preferred form of the implement comprises a blade 13 which is relatively narrow and thin having its outer end tapering into a suitable pick point 14. The inner flat end of the blade 13 is suitably apertured for the reception of the threaded shank 11. The blade 13 rests against the lower end of the handle 10 and is held in such position by the nut 12. The blade 13 is given a slight backward curve at its outer end and is provided upon its inner end with an extension 15 projecting beyond the handle 10 and at right angles thereto. A resilient bar 16 is secured across the inner face of the extension 15 having its ends projecting considerably there beyond to provide a pair of spring arms. Depending tines 17 are carried upon the outer ends of the arms 16 and are held upon the arms by rivets, welding, or the like. The tines 17 extend down in parallelism and are suitably pointed for engagement in the ground, and are spaced apart to admit of the passage of earth thereabout when digging potatoes.

In use, the pick point 14 is employed in digging about roots and the like where a relatively thin blade is necessary. When it is desired to lift potatoes from the ground, the implement is turned over to engage the tines 17 in the ground to loosen the same and bring the potatoes to the surface. As the tines are relatively thin the earth breaks away and passes about the opposite edges of the same. The spring arms 16 yield slightly under pressure and rebound forwardly effecting a throwing action to insure the separation and the breaking up of the earth.

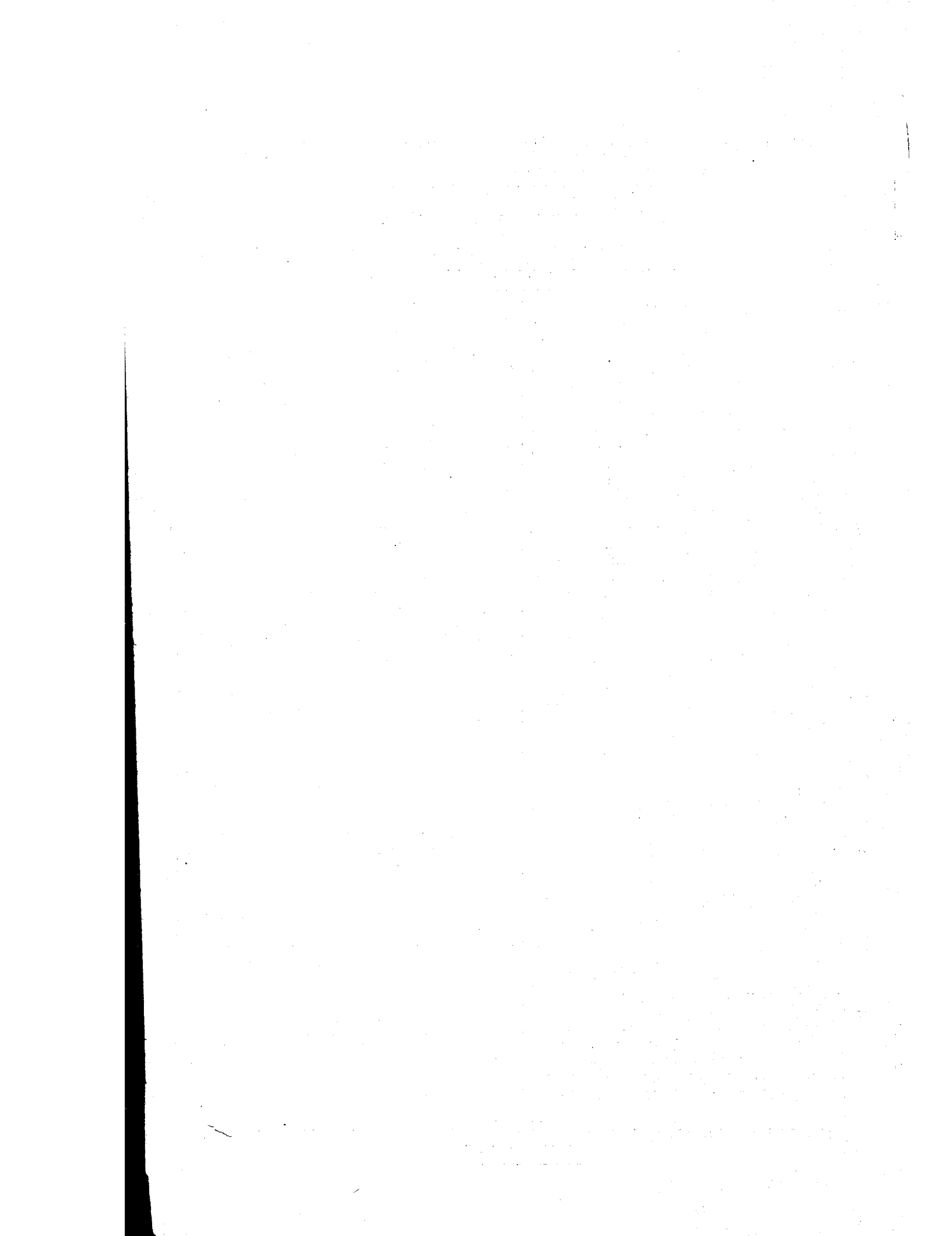

Having thus described the invention, what is claimed is:

A hoe comprising a blade, a handle attached thereto at a point between the ends thereof, a resilient bar attached to one end of the blade and lying transversely with relation to the same and spaced from the handle, and tines attached to the end of the said bar and extending approximately parallel with the blade.

In testimony whereof, I affix my signature in presence of two witnesses.

CHARLES E. SHAFER. [L. S.]

Witnesses:
CLARENCE M. ALBAUGH,
J. FRANCIS THOMAS.

Copies of this patent may be obtained for five cents each, by addressing the "Commissioner of Patents, Washington, D. C."